FIG_1

FIG_2

INVENTORS
ERNEST A. VERRINDER
DONALD D. DERRICOTT
BY Hans G. Hoffmeister
ATTORNEY Aug. 2, 1966   E. A. VERRINDER ET AL   3,263,829
ARTICLE HANDLING APPARATUS

Original Filed July 8, 1960   5 Sheets-Sheet 4

INVENTORS
ERNEST A. VERRINDER
DONALD D. DERRICOTT

BY Hans G. Hoffmeister
ATTORNEY

INVENTORS
ERNEST A. VERRINDER
DONALD D. DERRICOTT

BY *Hans G. Hoffmeister*

ATTORNEY

United States Patent Office 3,263,829
Patented August 2, 1966

3,263,829
ARTICLE HANDLING APPARATUS
Ernest A. Verrinder, Riverside, Calif., and Donald D. Derricott, Cincinnati, Ohio, assignors to FMC Corporation, San Jose, Calif., a corporation of Delaware
Continuation of application Ser. No. 41,533, July 8, 1960. This application Oct. 28, 1963, Ser. No. 320,256
14 Claims. (Cl. 214—8.5)

This invention pertains to article handling apparatus, and more particularly relates to apparatus for removing articles from a pallet.

This application is a continuation of the application of Ernest A. Verrinder and Donald D. Derricott, Serial No. 41,533, filed July 8, 1960, now abandoned.

An object of the present invention is to provide an improved method of disassembling articles from a pallet load of articles.

Another object is to provide an apparatus that will remove articles from a pallet more efficiently than has heretofore been possible.

Another object is to provide an article handling apparatus made up of very simple mechanisms that provide an inexpensive compact unit.

Another object is to provide an improved carriage for stripping articles from a pallet load of articles.

Another object is to provide an efficient drive mechanism for a carriage of a pallet unloading machine.

Another object is to provide an improved pallet handling mechanism.

Another object is to provide improved conveying means for an article handling machine.

Another object is to provide an improved control system for a depalletizing machine.

Other and further objects and advantages of the present invention will become apparent from the following description taken in connection with the accompanying drawings.

Figure 1:
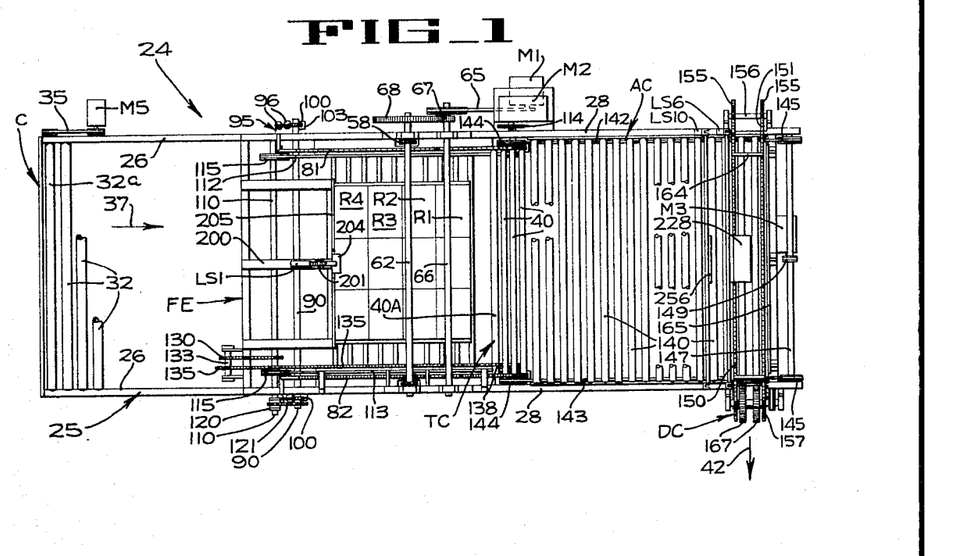
FIGURE 1 is a more or less diagrammatic plan view, partly broken away, of the machine of the present invention, showing one position of the mechanism during a pallet unloading operation.
Figure 2:
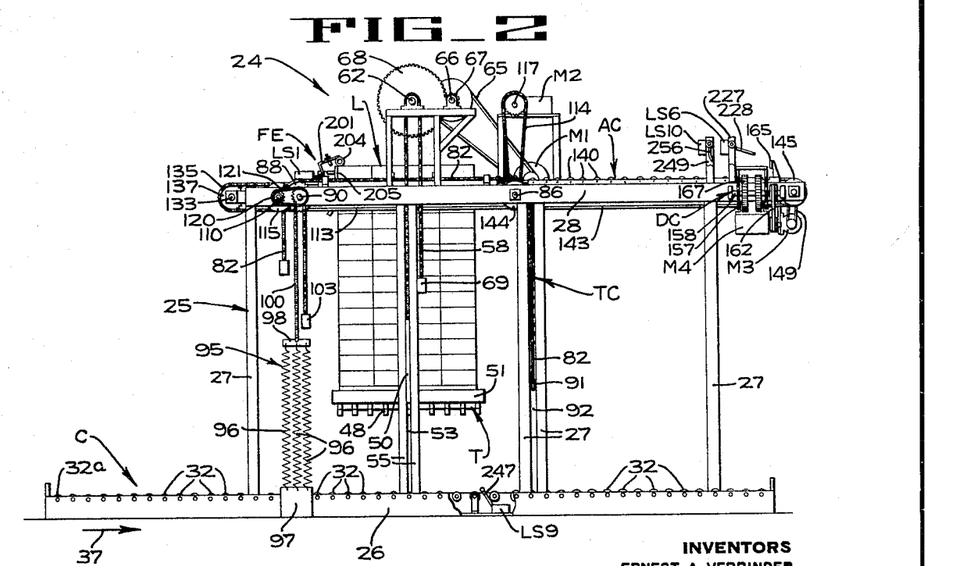
FIGURE 2 is a diagrammatic side elevation of the machine of FIGURE 1.

The embodiment of the depalletizing machine of the present invention shown in FIGURES 1 and 2 comprises, in general, a frame support structure 25 having a base 26, a plurality of spaced vertical posts 27, and an upper support frame 28. A pallet feed conveyor C is provided in the base 26 in the form of a plurality of rollers 32 that are interconnected in mutual driving relation by a sprocket and chain drive (not shown) that is operatively connected to the ends of several rollers. The rollers are driven by a motor M5 (FIG. 1) through a sprocket and chain drive 35 that is connected to the end roller 32a of the conveyor.

Figures 3, 4:
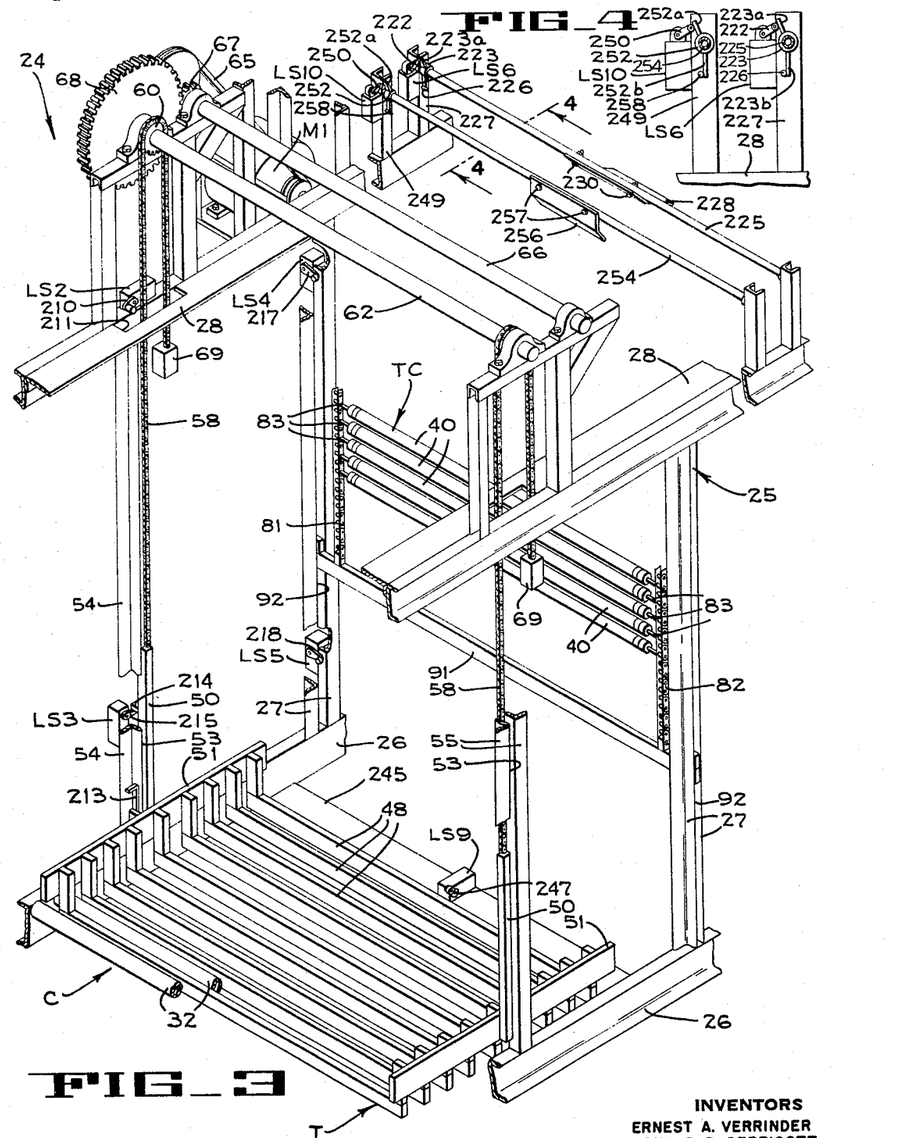
FIGURE 3 is an enlarged fragmentary diagrammatic perspective of a portion of the machine of FIGURE 1.
FIGURE 4 is an enlarged vertical section taken on line 4—4 of FIGURE 3.

When a loaded pallet is deposited, as by means of a fork lift truck, on the pallet conveyor C, and the motor M5 is energized, the loaded pallet is moved into the machine in the direction indicated by reference arrow 37. The pallet will be advanced to a position above an elevator table T, which at that time will be in a lowered position below the surface of the conveying rollers 32. When the loaded pallet is in position, the table T is moved upwardly until the uppermost layer of articles is positioned a short distance above the upper frame 28, as indicated by layer L in FIG. 2. As seen in FIG. 1, a layer of articles consists of several transverse rows R1, R2, R3 and R4. A flexible, article-stripper or transfer carriage TC (FIGS. 2 and 3), in the form of a plurality of interconnected transverse stripper rollers 40 (FIGS. 3 and 5) is moved toward the left (FIG. 2) to successively engage the articles row by row, lift the articles and transfer each row to an accumulator carriage AC which delivers each row to a diverter conveyor DC (FIG. 1) for movement laterally off the machine in the direction of arrow 42 to a suitable take-away conveyor (not shown).

The elevator table T comprises a grid-like support plate 48 (FIG. 3), the transverse bars of which are adapted to be disposed between adjacent rollers 32 of the pallet conveyor when the table is in its lowermost position. A rigid post 50 is secured to each bar 51 of the grid 48 and projects upwardly therefrom. Each post 50 is disposed in a guide slot 53, the slots 53 on one side of the machine being formed by two spaced vertical angle bars 54 that are part of the support structure of the machine, and the slot 53 on the other side being formed by two vertical bars 55. A lifting chain 58 is secured to the upper end of each post 50, and each chain is trained around a sprocket 60 that is keyed to a shaft 62 rotatably journalled in the support structure. A reversible motor M1 drives shaft 62 through a belt and pulley drive 65, an idler shaft 66, a gear 67 keyed to shaft 66 and a gear 68 that is in mesh with gear 67 and keyed to shaft 62. A counterweight 69 is secured to the end of each chain 58.

The stripper or transfer carriage TC comprises the several elongated parallel cylindrical rollers 40, each of which is secured at its opposite ends to chains 81 and 82 (FIGS. 5 and 6) by means of pins 83 that are connected to the chain links. The rollers 40 are provided with friction surfaces such as a rubber covering or tape so that the rollers will effectively grip the articles. Each of the chains 81 and 82 is trained over a sprocket 85 (FIG. 6) that is freely journalled on a transverse shaft 86 rotatably mounted in suitable bearings in the upper support frame 28. Each chain is also trained around a sprocket 88 (FIG. 5) that is keyed to a forward transverse rotary drive shaft 90. A bar 91 (FIG. 3) is connected between the rearward end of the chains, and each end of the bar is slidably disposed in a slot 92 formed by two vertical angle bars 27 of the support structure of the machine.

Figures 5, 6, 7:
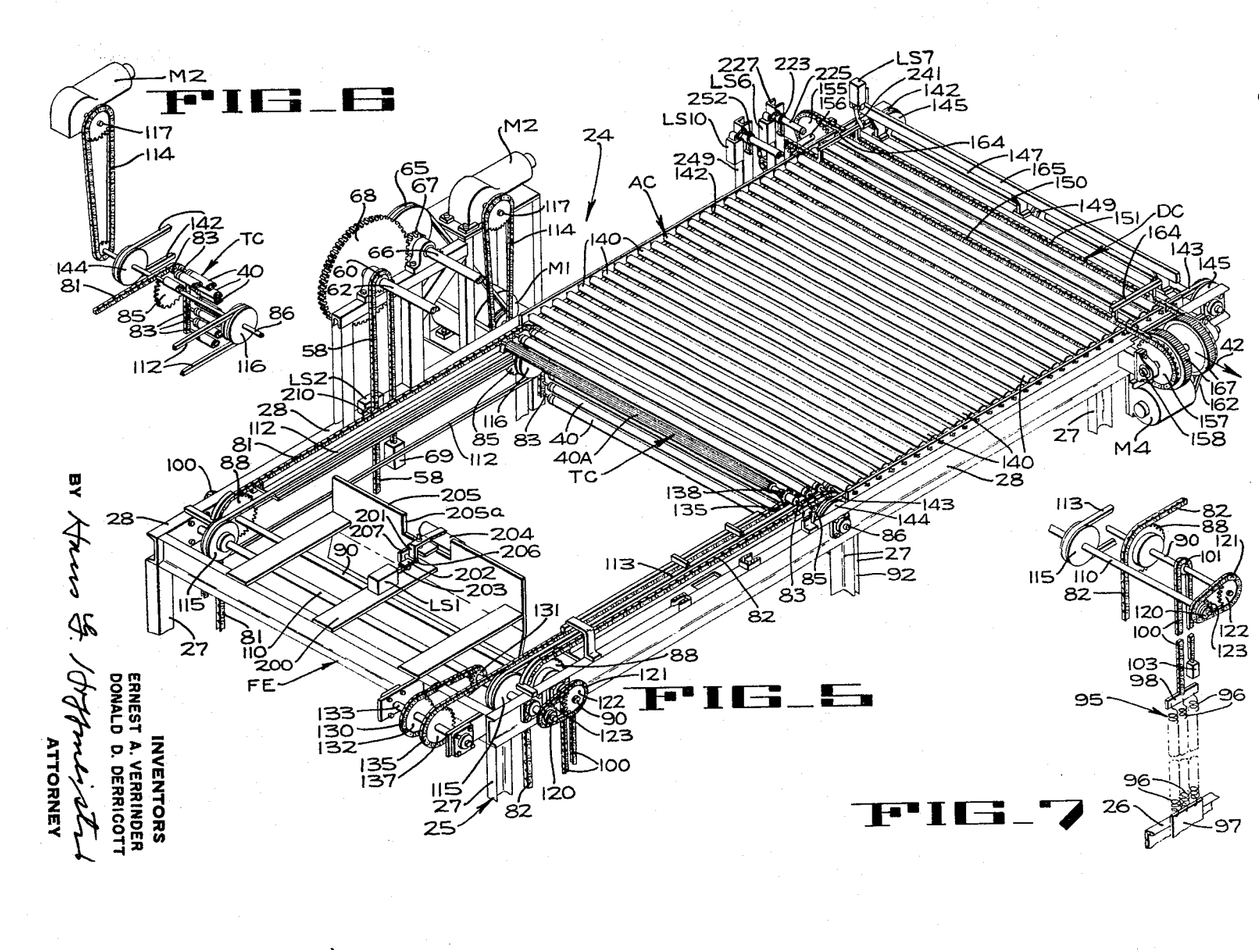
FIGURE 5 is an enlarged fragmentary diagrammatic perspective of the upper portion of the machine of FIGURE 1.
FIGURES 6 and 7 are schematic perspectives of portions of the drive mechanism of the machine of FIGURE 1.

The transfer carriage TC is moved from its rearward position shown in FIG. 5, toward the forward end FE of the machine by means of a tension spring unit 95 (FIGS. 2 and 7) that is made up of a plurality of springs 96 connected at one end to a plate 97 that is fixed to the stationary base 26, and connected at the other end to a bar 98. A chain 100, which is secured to the bar 98, is trained around a sprocket 101 (FIG. 7) that is keyed to the forward drive shaft 90. A counterweight 103 is secured to the free end of chain 100.

The transfer carriage is moved to the rearward position shown in FIG. 5 by means of a second transverse drive shaft 110 which is parallel to drive shaft 90 and is journalled in the upper frame 28. This second drive shaft 110 is driven by two V-belts 112 and 113, each of said belts being trained around a pulley 115 keyed to shaft 110 and around a drive pulley 116 keyed to the shaft 86. The shaft 86 is driven by a reversible motor M2 through a chain and sprocket mechanism 114 that is connected to the motor drive shaft 117. Accordingly, when the motor shaft 117 is rotated, the shaft 86 drives the shaft 110 through the two V-belts 112 and 113.

A one-direction clutch 120 (FIG. 7) is mounted on the shaft 110 and is so arranged that, when shaft 110 is rotated clockwise, it will drive shaft 90 clockwise through a chain 121 that is trained over a sprocket 122 keyed to shaft 90 and over a sprocket 123 secured to the clutch 120. When the shaft 110 is rotated counterclockwise, the clutch 120 will overrun and will not drive the sprocket 121. It is to be noted that, when the spring unit 95 exerts a downward pull on chain 100 and rotates the shaft 90 counterclockwise to move the transfer carriage to the forward end of the machine, the sprocket 122 will drive the chain 121 while sprocket 123 overruns on the shaft 110. Accordingly, the carriage TC, which is carried by chains 81 and 82, is moved forwardly only by the spring unit 95, and is moved rearwardly by the drive shaft 110 driving through clutch 120.

The V-belts 112 and 113 not only drive the shaft 110 but they also frictionally engage the undersurface of the transverse rollers 40 of the transfer carriage to rotate the rollers.

The drive arrangement is such that, when the transfer carriage TC is being moved toward the forward end of the machine by the spring unit 95, the shafts 86 and 110 are driven counterclockwise, causing the upper run of the V-belts to be moved toward the forward end of the machine. The carriage TC is moved bodily forward at about the same linear speed as the upper run of the V-belts. Accordingly, when the leading roller engages the first article and the forward movement of the carriage is momentarily stopped, the upper runs of the V-belts begin to move faster than the carriage and the rollers 40 are rotated clockwise by the V-belts during the remainder of the time they are carried toward the forward end of the machine. Also, when the carriage is moved toward the rear of the machine due to clockwise rotation of shaft 110, shafts 90 and 86 are rotated clockwise, and the upper runs of the belts 112 and 113 are moved toward the rear of the machine at about the same linear speed as the carriage.

The forwardmost of the rollers 40 is designated as 40A (FIG. 5). Roller 40A is not frictionally driven by V-belts but is positively driven from shaft 110 through a chain 130 trained around a sprocket 131 keyed to shaft 110 and a sprocket 132 keyed to a shaft 133 that is rotatable in frame 28. A second chain 135, which is trained around a sprocket 137 keyed to shaft 133, is in driving engagement with a sprocket 138 keyed to the roller 40A. Thus, when shaft 110 is driven counterclockwise during the forward movement of the carriage TC, the upper run of the chain 135 is moved toward the forward end of the machine to positively drive roller 40A in a clockwise direction. Similarly, when shaft 110 is rotated clockwise during rearward movement of the carriage TC, the upper run of the chain 135 is moved rearwardly and tends to positively drive roller 40A in a counterclockwise direction. However, since the carriage TC is carrying the roller 40A bodily in the same direction as the chain 135 at about the same speed as the chain, the counterclockwise rotation of the roller is very small and does not materially retard the rearward movement of the article as it is transported rearwardly by the carriage.

The accumulator conveyor AC comprises a plurality of transverse rollers 140 that are rotatably journalled in the upper frame 28 and are rotated by two V-belts 142 and 143 (FIG. 1) which frictionally engage the underside of the rollers. Each belt is trained around a pulley 144 that is freely rotatable on shaft 86 and around a pulley 145 that is keyed on a transverse shaft 147 mounted on the rear end of the machine. A motor M3 (FIGS. 1 and 2) drives the shaft 147 through a belt 149. The motor M3 is a reversible motor which is driven in one direction during depalletizing and in the opposite direction during palletizing.

The diverter conveyor DC comprises a pair of spaced parallel chains 150 and 151 (FIG. 1) that extend transversely across the rear end of the machine. Each chain is trained over a sprocket 155 journalled on a short shaft 156, and around a sprocket 157 keyed to a shaft 158 (FIG. 5) that is driven by a motor M4 through a belt 162. The motor M4 is also a reversible motor which is driven in one direction during depalletizing and in an opposite direction during palletizing. A plurality of pusher bars 164 are secured to the parallel chains 150 and 151. The upper runs of the chains 150 and 151 are disposed below the surface of the rollers 140 of the accumulator conveyor AC while the pusher bars are disposed above the rollers. Accordingly, when a row of articles is moved to a position against a guide bar 165 above the chains 150 and 151, the next pusher bar 164 on the chains will engage the row of articles and push them in the direction of arrow 42 out of the machine. A pair of large, rubber covered rollers 167 are keyed to the shaft 158 and act as accelerator rollers causing separation of the articles of the row as they are moved out of the machine.

Figure 8:
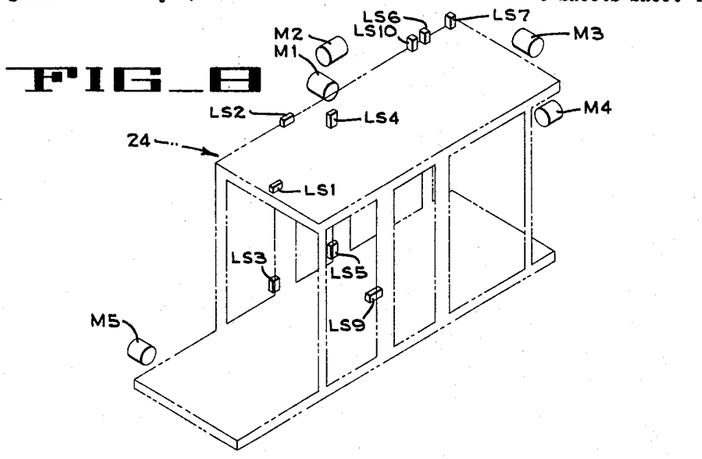
FIGURE 8 is a diagrammatic perspective showing the location of the motors and electrical control switches used during a depalletizing operation.

In FIGURE 8 the switches of the electrical control circuit employed with the depalletizer are diagrammatically shown. Switch LS1 is mounted on a stationary bracket 200 (FIG. 5) that is secured to the frame 28 above a transverse stop plate 205 near the forward end of the machine. An actuator 201 is pivotally mounted by a removable pivot pin 206 on an arm 207 projecting from the stop plate 205. The actuator is disposed in a notch 205a in the plate 205 and has an arm 202 at one end arranged to engage the switch arm 203. At its other end, the actuator 201 has a cylindrical member 204 arranged to be contacted by an article in row R4 of the uppermost layer of articles on the table T as seen in FIG. 2. When the article moves the member 204 upwardly, the switch arm 203 is actuated to de-energize the motor M1 which causes the elevation of the table.

Switch LS2 (FIGS. 3 and 8) is mounted on the frame 28 and has a switch arm 210 overlying an opening 211 in the frame. When the table T has been raised to the level at which the last layer of articles is in position to be removed from the pallet on the table T, an arm 213 (FIG. 3) projecting upwardly from the table engages the switch arm 210 to actuate the switch LS2 to partially close a circuit which, when energized, will cause the shaft of the motor M1 to be rotated in a direction to lower the table.

Switch LS3 is mounted on the outer side of the vertical angle bars 54 (FIG. 3) and has a switch arm 215 that is positioned to be contacted by a lug 214 on the upstanding rod 50 on that side of the table T during downward movement of the table. When switch LS3 is actuated by the lug 214, the downward movement of the table is stopped.

Switch LS4 is mounted on the outer side of one of the vertical posts 27 and has a switch arm 217 projecting into the guide slot 92 in the path of movement of bar 91 at the rear end of the article transfer carriage TC. The switch LS4 is so positioned that, when the carriage has reached its forwardmost position, the bar 91 actuates the switch LS4 to de-energize the coils of motor M2 which causes the rotation of the motor drive shaft in the direction effecting forward movement of the upper runs of belts 112 and 113 during movement of the carriage to the forward end of the machine.

Switch LS5 is mounted directly below switch LS4 and has an actuator 218 arranged to be engaged by the bar 91 of the carriage when the carriage has reached its rearmost position after stripping a layer of articles from the pallet on table T.

Switch LS6 (FIGS. 3 and 4) is mounted on a post 227 projecting upwardly from the frame 28 near the rear end of the machine. The switch LS6 has an arm 222 arranged to be engaged by an upper arm 223a of an actuator 223 that is setscrewed to a transverse shaft 225. A lower arm 223b of actuator 223 engages a stop pin 226 on the post 227. An article-intercepting plate 228 (FIG. 3), which overlies the central portion of the accumulator conveyor AC, is removably secured to the transverse shaft 225 by setscrews 230 and exerts a turning force on the shaft to rotate the shaft and move the lower arm 223b of actuator 223 against stop pin 226 and move the upper arm 223a out of contact with the switch arm 222. When a row of articles passes from the accumulator conveyor to the diverter conveyor, one of the articles engages the plate 228 and pivots the shaft 225 counterclockwise (FIG. 3) causing the actuator arm 223a to engage and actuate the switch arm 222. When the switch LS6 is thus actuated, the motor M3 which drives the live rollers of the accumulator conveyor is de-energized and the motor M4, that drives the chains of the diverter conveyor, is energized.

Switch LS7 (FIGS. 5 and 8) is mounted on the guide bar 165 which is secured in fixed position across the rear end of the machine. The switch has a curved arm 241 arranged to be engaged by each pusher bar 164 of the diverter conveyor DC as the plate comes upwardly around the end of the conveyor. The switch LS7 is so located that, when the curved arm 241 is engaged by a pusher bar, that bar has not yet reached a position in the path of a row of articles being advanced on the accumulator conveyor. Thus, when the switch arm 241 is actuated, the diverter conveyor motor M4 is de-energized and a pusher bar 164 is stopped in a position such that the next row of articles can be moved onto the diverter conveyor in front of the bar. Then, when the diverter conveyor is started again, that pusher bar will engage and push the row of articles from the machine.

Switch LS9 (FIGS. 3 and 8) is mounted on a cross bar 245 of the support structure base 26 adjacent the rear end of the table T, when the table is in its lowered position. The switch has an arm 247 arranged to be engaged by a loaded pallet as the pallet is brought into the machine. When switch arm 247 is actuated, the motor M5 that drives the pallet supply conveyor C is de-energized, and the coils that cause the shaft of the motor M1 to be rotated in a direction to raise table T, are energized.

Switch LS10 (FIGS. 3 and 8) is mounted on a post 249 projecting up from the upper frame 28 adjacent switch LS6. An actuator 250 of switch LS10 is arranged to be engaged by an upper arm 252a of an actuator 252 that is setscrewed to a transverse rotary shaft 254. A contact plate 256, that overlies the accumulator conveyor, is secured by setscrews 257 to shaft 254 and, due to its weight, tends to rotate the shaft clockwise (FIG. 3) to move a lower arm 252b against a fixed stop pin 258. When an article of an advancing row of articles engages the plate 256, the shaft 254 is rotated counterclockwise and the switch arm 250 is actuated by the actuator upper arm 252a to open switch LS10. If a row of articles is still on the diverter conveyor, motor M3 will be de-energized and the accumulator conveyor roller will be stopped so that the row of articles on the accumulator will not be moved onto the diverter conveyor while a previous row is still being moved laterally by that conveyor.

Figure 9:
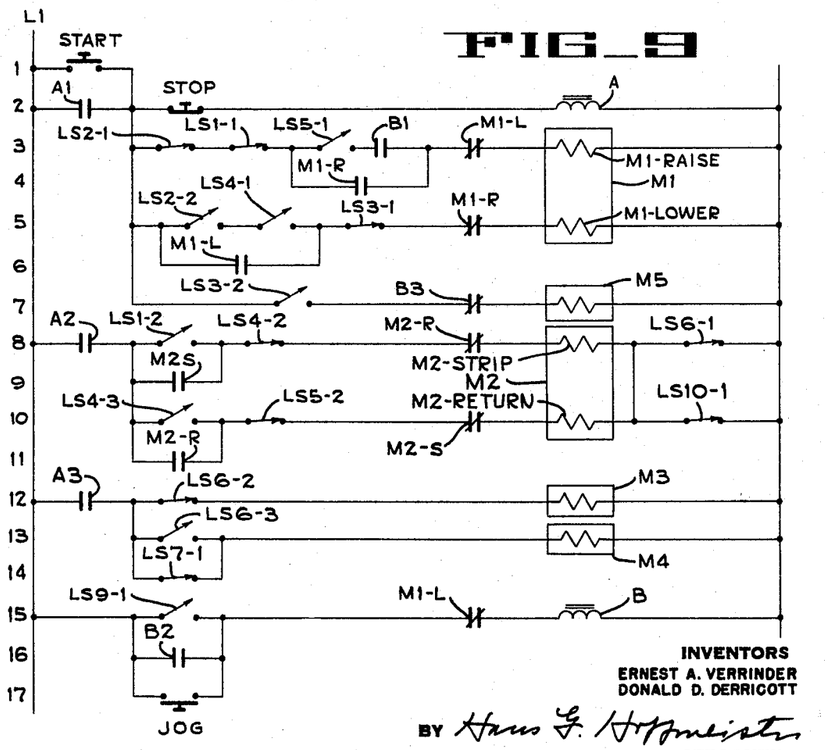
FIGURE 9 is a diagram of the electrical control circuit used to carry out a pallet unloading operation.

A complete cycle of the depalletizing operation will be explained in connection with the electrical control diagram of FIGURE 9 and the schematic operational views of FIGS. 10–14. In FIG. 9, the lines L1, L2 indicate a source of 110 volt A.C., 60 cycle electricity. At the beginning of a depalletizing operation, the transfer carriage TC, which acts as a stripper during a depalletizing operation, is at the rear of the machine in engagement with switch LS5 holding contact LS5–1 in circuit 3 closed and holding LS5–2 contact in circuit 10 open. Also, at this time, the table is in its lowered position holding open contact LS3–1 in circuit 5 and closing contact LS3–2 in circuit 7. Further, one of the lugs 164 on the diverter conveyor is holding contact LS7–1 in the circuit 14 open to de-energize the diverter conveyor motor M4. To start the operation, the start button in circuit 1 is momentarily closed to energize relay A in circuit 2 and cause relay contact A1 in circuit 2, A2 in circuit 8, and A3 in circuit 12 to close. Since contact LS3–2 in circuit 7 is closed, the pallet conveyor motor M5 will be energized. Also, the live roll accumulator conveyor motor M3 in circuit 12 will be energized. A loaded pallet is brought in on the pallet conveyor and engages and closes contact LS9–1 of switch LS9 in circuit 15 to energize the relay B which is locked in through contact B2. Contact B3 in circuit 7 opens to de-energize the pallet conveyor motor M5. Contact B1 in circuit 3 closes to energize the raise magnetic M1–RAISE of motor M1 causing the elevator to move upwardly and raise the table. Contact M1–R in circuit 5 opens to prevent actuation of the lower magnetic during upward movement of the elevator. As the table moves away from switch LS3, contact LS3–1 in circuit 5 closes and contact LS3–2 in circuit 7 opens. An article on the top layer L (FIG. 10) of the load engages switch LS1 and opens contact LS1–1 in circuit 3 to de-energize the raise magnetic M1–RAISE of motor M1 to stop the table in the predetermined desirable position for depalletizing.

Also, contact LS1–2 in circuit 8 is closed to energize the magnetic M2–STRIP of motor M2 which drives the shaft 110 counterclockwise and moves the upper runs of V-belts 112 and 113 forwardly as the carriage TC is moved forward by the spring unit 95. Contact M2–S in circuit 10 opens to prevent the energizing of the return coil during forward movement of the carriage. The magnetic M2–STRIP is locked in through M2–S in circuit 9. As the stripper carriage moves forward, switch LS5 is permitted to return to its normal condition, causing contact LS5–1 in circuit 3 to open and contact LS5–2 in circuit 10 to close.

As the carriage TC moves forwardly, its leading roller 40A is rotated clockwise by the shaft 110 and the trailing rollers 40 are rotated clockwise (FIG. 10) as soon as they come into engagement with the forwardly moving runs of V-belts 112 and 113 and the carriage engages the leading article of the layer. When the leading roller 40A engages the first row R1 of articles, the friction surface of the roller lifts up the articles and moves the articles to its upper surface. As the forward movement of the carriage continues, the roller 40A lifts up each row of articles in turn, as shown in FIGS. 11–14, and moves the articles rearwardly over the trailing rollers 40, which are of course also rotating clockwise. Each row of articles is thus carried rearwardly, in substantially equally spaced relation to adjacent rows, and is deposited on the live rollers 140 of the accumulator conveyor AC.

Figure 10:
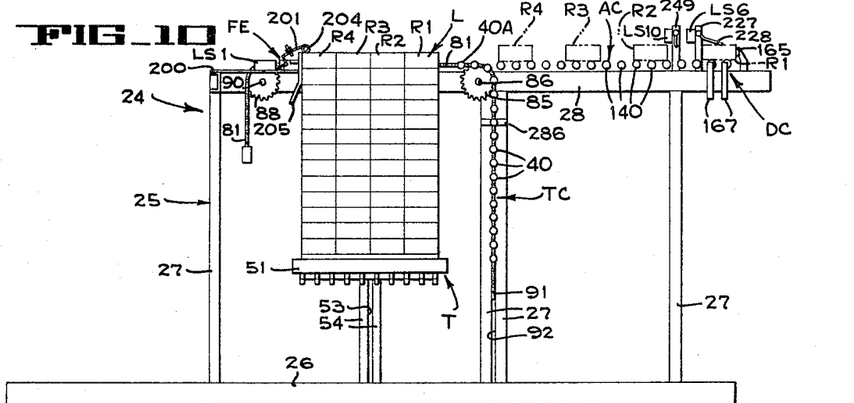
FIGURES 10–14 are diagrammatic operationl views showing consecutive steps in a pallet unloading operation.
Figure 11:
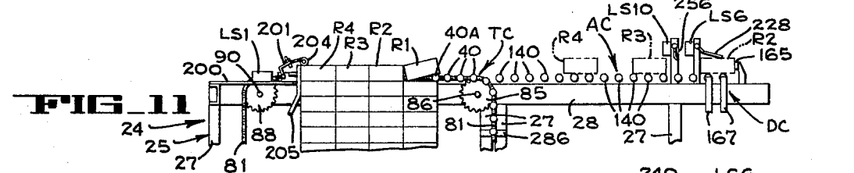
Figure 12:
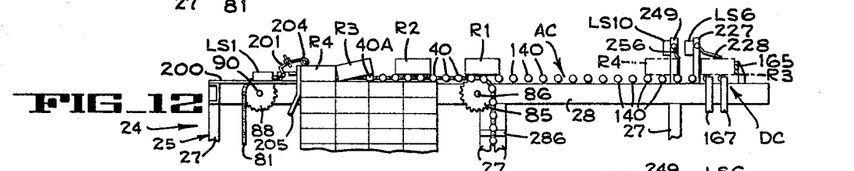
Figure 13:
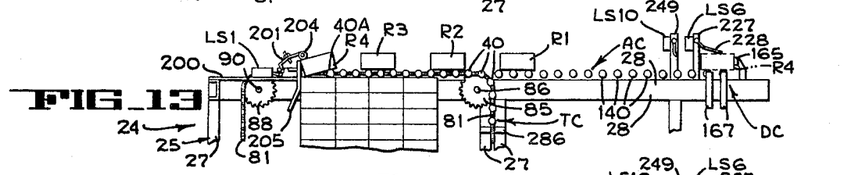
Figure 14:
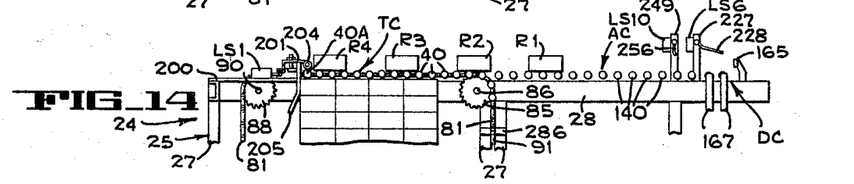

In FIG. 10, at the right side of the accumulator AC, the rows R1–R4 are shown in phantom lines in the positions they assume on this conveyor as they approach the diverter conveyor DC.

When the stripper separates the first row of articles of the layer away from the row next behind, this first row is carried rearwardly and engages plate 256 to open switch LS10. No control operation occurs and this first row passes on to the diverter conveyor where it engages and moves plate 228 to open contacts LS6–1 in circuit 8. Contact LS6–2 in circuit 12 is opened to de-energize the accumulator conveyor motor M3, and contact LS6–3 in circuit 13 is closed to energize motor M4 of the diverter conveyor. When the motor M4 is energized, the lug of the conveyor starts to sweep the first row of articles out of the diverter conveyor.

In order to maintain a desired spacing between successive rows of articles on the accumulator conveyor, it is necessary to stop the stripper rollers when the accumulator is stopped. Accordingly, the row of articles following the row on the diverter will engage plate 256 and open the contact LS10–1 of switch LS10 in circuit 10 to de-energize the motor magnetic M2–STRIP and stop the belts which rotate the stripper rollers. When the first row is clear of plate 228 contact LS6–1 in circuit 8 closes to re-energize motor magnetic M2–STRIP and start the stripping operation of the stripper again. Contact LS6–2 in circuit 12 closes to energize motor M3 and once more start the accumulator live roll conveyor. Contact LS6–3 in circuit 13 opens and, when the first row of articles has cleared the diverter conveyor, one of the lugs on the diverter conveyor engages and opens the switch contact LS7–1 in circuit 14 to de-energize motor M4 to stop the diverter conveyor.

The second row R2 now enters the diverter conveyor and engages plate 228 to open contact LS6–1 in circuit 8, open contact LS6–2 in circuit 12 to de-energize motor M3 of the live roll conveyor AC, and close contact LS6–3 in circuit 13 to energize motor M4 of the diverter conveyor. In a preferred arrangement, the speed of the various conveyors and the stripper carriage are so chosen that the diverter conveyor will discharge the row of articles thereon before the next row contacts plate 256.

When all of the rows of boxes of a particular layer have been directed rearwardly, the stripper carriage arrives at the forward end of its stroke and opens contact LS4–2 of switch LS4 in circuit 8 to de-energize the magnetic M2–STRIP and stop the rotation of the rollers of the stripper carriage. Contact LS4–3 in circuit 10 is closed to energize the motor magnetic M2–RETURN that causes the rearward movement of the stripper carriage. Contact M2–R in circuit 8 opens to prevent the energizing of the strip magnetic during rearward movement of the carriage. As the stripper carriage reaches its rearmost position, contact LS5–2 of switch LS5 in circuit 10 is opened to de-energize the motor magnetic M2–RETURN. Contact LS5–1 in circuit 3 is closed to energize the magnetic M1–RAISE of motor M1 to start the upward movement of the elevator to move the next layer of articles to article-stripping position.

While the last layer of boxes is being removed from the pallet, the table T engages switch LS2 to close the contact LS2–2 in circuit 5. Then, when the last row of the last layer of boxes is on the stripper carriage and being moved rearwardly, and switch LS4 is engaged by the stripper during its rearward movement, contact LS4–1 of LS4 in circuit 5 is closed to energize magnetic M1–LOWER, causing the table to be lowered. Contact M1–L in circuit 15 opens to de-energize relay B and contact M1–L in circuit 3 opens to prevent the energizing of the raise coil. The stripper carriage opens contact LS5–2 in circuit 10 to de-energize the motor return magnetic M2–RETURN. In its lowest position, the table engages switch LS3 and opens the contact LS3–1 in circuit 5 to de-energize motor magnetic M1–LOWER and to close contact LS3–2 in the circuit 7 to energize motor M5 which is the pallet conveyor motor. The empty pallet is thereby conveyed rearwardly through the machine, and a loaded pallet which has, during the operation of the palletizer, been deposited by a fork lift truck or the like on the feed-in conveyor C, is moved into position under the stripper carriage.

While the stripper carriage has been illustrated as having only one positively driven roller, it is within the scope of the present invention to positively drive all the rollers of the carriage. Similarly, in certain installations, all the rollers may be frictionally driven.

From the foregoing description it will be evident that the present invention provides a particularly simple depalletizing machine which removes articles from a pallet in a unique and efficient manner.

It is within the scope of the present invention to use the transfer carriage TC with other support structures, other control circuits, and different arrangements of the accumulator conveyor, the diverter conveyor and other article handling mechanisms. For the transfer carriage to remove an article from a support, it is necessary only that the carriage be moved into engagement with the side wall of the article while the rollers of the carriage are rotated in a direction to frictionally urge the article upwardly toward the upper surface of the carriage.

Having thus described the invention, what is claimed as new and desired to be protected by Letters Patent is:

1. A machine for unloading articles from a pallet load formed of transversely aligned rows of articles arranged in multi-row layers, comprising a support structure having an elevated frame, an elevator mounted on said structure for receiving a loaded pallet, power means arranged when activated to raise said elevator to a predetermined position wherein the uppermost layer of articles is disposed in a horizontal plane, a transfer carriage having a plurality of transversely extending rollers mounted on said platform for movement in said horizontal plane in a first direction toward a position superposed above said elevator and in a second direction away from said superposed position, drive means for moving said carriage toward said position, a driven belt mounted on said platform and disposed in frictional engagement with selected ones of said rollers when said carriage is spaced from the position above said elevator and in engagement with substantially all of said rollers when said carriage is in said superposed position, means for moving said belt in said first direction to rotate the rollers in contact therewith, frictional article engaging means carried by the roller nearest the pallet, and control means associated with said elevator raising means for deactivating said elevator raising means when the uppermost layer of articles is elevated to said predetermined position in the path of movement of said carriage and associated with said carriage drive means for energizing said drive means to move said transfer carriage toward the articles on the pallet, said leading roller frictionally engaging the lower end of side wall portions of the articles and lifting the row of articles onto said leading roller, whereby the articles are moved onto succeeding rollers which convey the articles rearwardly while the carriage is advanced toward the next transverse row of articles.

2. A machine for unloading successive transverse rows of articles from a pallet load formed of transversely aligned rows of articles in layers, comprising means for positioning the uppermost layer of articles with their bottom surfaces in a predetermined horizontal plane, a carriage reciprocable in said plane between a forward position and a rearward position, a positively driven roller mounted in said carriage and having frictional article engaging means, a plurality of frictionally driven rollers mounted in said carriage parallel to said positively driven roller and said transverse article row, belt means extending normal to said rollers and disposed in frictional driving engagement with said frictionally driven rollers when said carriage is in its forwardmost position and engaging selected ones of said rollers when said carriage is in its rearwardmost position, reversible drive means connected to said belt means, movement of said belt means in one direction being effective to impart a tangential push to said rollers tending to rotate said rollers and urge the rollers bodily in a forward direction, resilient means urging said carriage toward said forwardmost position, control means for operating said reversible drive means when the uppermost article layer is positioned in said predetermined plane in the path of movement of said carriage for moving said belt means in said one direction to initiate the forward movement of said carriage under the urging of said resilient means, second drive means driven by said reversible drive means and connected to said driven roller to impart a push to said driven roller tending to rotate said positively driven roller in a direction to move its upper surface counter to the direction of carriage advance and tending to urge said driven roller bodily toward the forward end of the machine to assist in moving said carriage forward in conjunction with said resilient urging means to a position wherein the friction surface of said positively driven roller engages the lower end of side wall portions of the articles of the uppermost layer and by frictional engagement therewith lifts the row of articles onto said positively driven roller and moves the articles rearwardly onto said frictionally driven rollers while said carriage is advancing toward the next transverse row of articles.

3. In an article handling apparatus, a support structure, a transfer carriage mounted for reciprocating movement in said structure between a forward and a rearward position and including a pair of endless chains and a plurality of rollers rotatably secured between said chains, a first drive shaft operatively connected in driving engagement to said carriage, a spring drive mechanism connected to said first drive shaft to rotate said shaft in a direction to move said carriage to said forward position, a second drive shaft journalled in said structure adjacent said first drive shaft, a plurality of drive belts connected to said second drive shaft to be driven thereby and having friction surfaces in engagement with the rotatable rollers of said carriage, a uni-directional drive unit connected between said first and second drive shafts, means for rotating said second drive shaft in a direction to rotate said first drive shaft through said uni-directional drive unit in a direction to move said carriage to said rearward position against the resistance of said spring mechanisms and means for reversing the direction of rotation of said second drive shaft to permit said spring mechanism to move said carriage to the forward position, said uni-directional drive unit being adapted to disconnect said drive shafts during forward movement of said carriage.

4. In article handling apparatus, a support structure, a stripper carriage mounted for reciprocation in said structure between a forward and a rearward position and including a flexible frame and a plurality of rollers mounted for free rotation in said frame, a pallet elevator disposed in said structure, means for guiding said carriage for movement along a path having a horizontal portion over said pallet elevator and a substantially vertical portion alongside said elevator, power means operatively connected to said pallet elevator for raising and lowering said elevator, control means for activating said power means to move said elevator to a position wherein a plurality of articles carried by a pallet on said elevator are in the path of movement of the rollers as the carriage is moved toward its forward positon, and a power-driven endless drive member mounted in the upper portion of said support structure independently of said flexible carriage and adjacent the path of said flexible carriage and arranged to drivingly engage the forwardmost roller of said carriage to rotate said roller in a direction to cause the upper surface thereof to move rearwardly, as said carriage moves forwardly, whereby each article carried by the pallet will be contacted by the forwardmost roller in said carriage and raised and moved rearwardly over said carriage.

5. In article handling apparatus, a support structure, a transfer carriage mounted for reciprocating movement in said structure between a forward and a rearward position, a first drive shaft journalled in said structure and connected in driving relation to said carriage, a spring mechanism connected to said first drive shaft to rotate said shaft in a direction to move said carriage to its forward position, a second drive shaft journalled in said structure adjacent said first drive shaft, an overrunning clutch unit operatively connected between said shafts, and means for rotating said second drive shaft in a direction to drive said first shaft through said clutch unit to move said carriage to the rearward position against the resistance of said spring mechanism said clutch permitting said first drive shaft to remain stationary during movement of said carriage to forward position.

6. In article handling apparatus, a support structure, a transfer carriage mounted for reciprocating movement in said structure between a forward and a rearward position and including a pair of spaced endless chains and a plurality of rotatable rollers carried by said chains, a pair of shafts journalled in spaced relation in said support structure, a pair of spaced sprockets on each shaft, each sprocket on one shaft being aligned in the same plane as a sprocket on the other shaft, each aligned pair of sprockets being arranged to receive one of said endless chains, a spring drive mechanism connected to one of said shafts to turn said one shaft in a direction to rotate said sprockets and move said carriage to its forward position in said support structure, a third shaft journalled in said structure adjacent the particular shaft to which said spring drive mechanism is connected, a uni-directional drive unit operatively connected between said particular shaft and said third shaft, and means for rotating said third shaft in a direction to drive said particular shaft through said uni-directional drive unit to move said carriage to its rearward position.

7. In an article handling apparatus, a support, an elevator mounted for vertical movement in said support and adapted to carry a plurality of superposed articles, an articulated carriage mounted in said support for movement from a forward position wherein a major portion of the carriage is disposed in a horizontal position above said elevator and a rearward position wherein a major portion of said carriage is in vertical position alongside said elevator, means for actuating said elevator to position the uppermost article on the elevator in the path of movement of the carriage as it moves toward its forward position, rotary means on the leading edge of said carriage for engaging and lifting the article as it comes into contact with the article during forward movement of said carriage, means for moving said carriage between said forward and rearward positions, and power-driven endless drive members mounted in an upper portion of said support adjacent the path of movement of said articulated carriage as said carriage moves toward said forward position, each endless drive member having a reach in driving engagement with said rotary means for rotating said rotary means in a direction to lift the article in contact therewith.

8. A machine for unstacking a palletized load of articles in which the articles are arranged in layers comprising a support structure, an elevator mounted in said structure for vertical reciprocating movement, means for raising said elevator step-by-step in increments each one of which is equal to the depth of a layer of stacked articles in the load, a carriage mounted in said structure for movement between a forward position wherein a major portion of the carriage is disposed in generally horizontal position above said elevator and a rearward position wherein said carriage is disposed generally vertically alongside said elevator, rotary means on the forward edge of said carriage for engaging and lifting the articles on the elevator as said rotary means comes into contact therewith during forward movement of said carriage, means for moving said carriage between said forward and rearward positions, and power-driven endless drive members mounted in an upper portion of said support adjacent the path of movement of said articulated carriage as said carriage moves toward said forward position, each endless drive member having a reach in driving engagement with said rotary means for rotating said rotary means in a direction to lift the article in contact therewith.

9. In an article handling mechanism, a support, an elevator mounted in said support and adapted to carry a plurality of superposed layers of articles, a flexible carriage mounted for movement on said support between a generally horizontal position above said elevator and a generally vertical position alongside said elevator, means for positioning a layer of articles in the path of forward movement of said carriage, a roller mounted on the forward edge of said carriage and having a friction surface, power means for moving said carriage along said path to bring said roller into contact with the side edges of the articles of the uppermost layer of articles on said elevator, said power means including a spring mechanism operatively connected between said carriage and said support.

10. In an article handling mechanism, a support structure, a flexible stripper carriage mounted in said structure for movement along a predetermined path between a forward position wherein a major portion of said carriage is disposed in a substantially horizontal plane and a rearward position wherein a major portion of said carriage is disposed in a substantially vertical plane, means for positioning articles in the path of forward movement of said carriage means on the forward edge of said carriage for engaging the side edge of each article and raising it onto the upper surface of said carriage during continued forward movement of said carriage, and means for moving said carriage between said forward and rearward positions including a spring mechanism urging said carriage in a forward direction to resiliently urge the article gripping means on the carriage into contact with the articles.

11. In an article handling mechanism, a support structure, a flexible stripper carriage mounted in said structure for movemment along a predetermined path between a forward position wherein a major portion of said carriage is disposed in a substantially horizontal plane and a rearward position wherein a major portion of said carriage is disposed in a substantially vertical plane, means for positioning articles in the path of forward movement of said carriage, means on the forward edge of said carriage for engaging the side edge of each article and raising it onto the upper surface of said carriage during continued forward movement of said carriage, and means for moving said carriage between said forward and rearward positions, including a spring mechanism operatively connected to said carriage for urging said carriage to said forward position, and a uni-directional drive unit for urging said carriage to said rearward position against the resistance of said spring mechanism.

12. In an article handling mechanism, a support structure, a flexible stripper carriage including a plurality of transverse rollers mounted in said structure for movement along a predetermined path between a forward position wherein a major portion of said carriage is disposed in a substantially horizontal plane and a rearward position wherein a major portion of said carriage is disposed in a substantially vertical plane, means for positioning articles in the path of forward movement of said carriage, means on the forward roller of said carriage for engaging the side edge of each article and raising it onto the upper surface of said carriage during continued forward movement of said carriage, means for moving said carriage between said forward and rearward positions, and endless belt means mounted in said support structure and having a generally horizontal reach adjacent the path of movement of said carriage to engage the rollers of said carriage in frictional driving engagement as said carriage moves toward said forward position.

13. In an article handling apparatus, a support, an elevator mounted for vertical movement in said support and adapted to carry a plurality of superposed articles, an articlulated carriage mounted in said support for movement from a forward position wherein a major portion of the carriage is disposed in a horizontal position above said elevator and a rearward position wherein a major portion of said carriage is in vertical position alongside said elevator, said carriage comprising a plurality of spaced transverse rollers, means for actuating said elevator to position the uppermost article on the elevator in the path of movement of the carriage as it moves toward its forward position, means on the leading roller of said carriage for engaging and lifting the article as said roller comes into contact with the article during forward movement of said carriage, means for moving said carriage between said forward and rearward positions, and endless drive members mounted in said support structure independently of said carriage and adjacent the path of movement of said carriage as it moves toward said forward position, each endless drive member having a reach arranged to engage and drive at least one of the rollers of said carriage.

14. In an article handling apparatus, a support, an elevator mounted for vertical movement in said support and adapted to carry a plurality of superposed articles, an articulated carriage mounted in said support for movement from a forward position wherein a major portion of the carriage is disposed in a horizontal position above said elevator and a rearward position wherein a major portion of said carriage is in vertical position alongside said elevator, said carriage comprising a plurality of spaced transverse rollers, means for actuating said elevator to position the uppermost article on the elevator in the path of movement of the carriage as it moves toward its forward position, mean on the leading roller of said carriage for engaging and lifting the article as said roller comes into contact with the article during forward movement of said carriage, means for moving said carriage between said forward and rearward positions, and endless drive members mounted in said support structure independently of said carriage and adjacent the path of movement of said carriage as it moves toward said forward position, said drive members including chains for positively driving said leading roller and friction belts for driving the rollers trailing said leading roller.

References Cited by the Examiner

UNITED STATES PATENTS

| | | | |
|---|---|---|---|
| 1,348,599 | 8/1920 | Stuart | 198—110 |
| 1,464,513 | 8/1923 | Sutherland. | |
| 1,878,156 | 9/1932 | Lorenz | 214—134 |
| 2,172,488 | 9/1939 | Waters | 74—95 |
| 2,323,174 | 6/1943 | Wikle. | |
| 2,659,497 | 11/1953 | Verrinder. | |
| 2,774,489 | 12/1956 | Guigas. | |
| 2,815,870 | 12/1957 | Laub. | |
| 2,947,405 | 10/1960 | Fenton. | |
| 2,960,243 | 11/1960 | Beaulieu. | |
| 3,003,357 | 10/1961 | Votta | 74—95 |
| 3,017,041 | 1/1962 | Hawkes. | |
| 3,070,241 | 12/1962 | Johnston. | |
| 3,113,683 | 12/1963 | Von Gal. | |

MARVIN A. CHAMPION, *Primary Examiner.*

MORRIS TEMIN, HUGO O. SCHULZ, GERALD M. FORLENZA, *Examiners.*